Aug. 30, 1966  L. ABEL  3,269,649

NUMERO-GRAPHICAL TABLES

Filed June 8, 1964  3 Sheets—Sheet 1

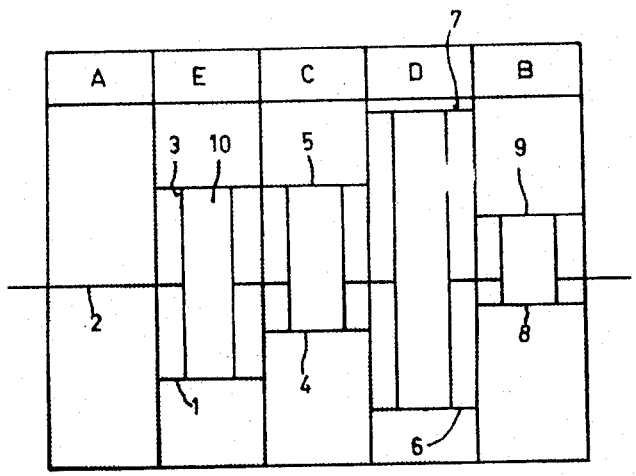

3,269,649
NUMERO-GRAPHICAL TABLES
Louis Abel, 18 Ave. Valmont, Lausanne, Switzerland
Filed June 8, 1964, Ser. No. 373,349
Claims priority, application Switzerland, June 6, 1963,
7,115/63; Jan. 28, 1964, 981/64
2 Claims. (Cl. 235—89)

The present invention relates to an improvement in numeral-graphical tables.

In current practice for analysis of economic data use is made of graphs or numerical tables which show up the relationship or co-relationship existing in any series of values observed in statistical studies as compared with another series of reference values. Particularly difficult problems are raised by co-relation studies where there are several series of values to be considered.

The usual methods require mathematical reasoning and the carrying out of calculations which are, generally speaking, long, and for this reason the results obtained or considered are often difficult to understand or to use by those who are not experts in mathematics. This is particularly the case with directors of companies, managers, owners of businesses, experts, political men and so on, who nevertheless have to take or inspire decisions which are of economic significance. It is in fact necessary for them to be able to make the decision quickly without the necessity of being obliged to have recourse to long and difficult calculations or to calculating machines, and to be able to record data instantaneously by means of graphs, permanently and visibly, in a word, to be able to draw up documents, keep notes and memoranda and so on, and to be able to do all this in an accurate manner on a pre-printed scale which makes it possible to refer back, to read off, to compare, to check and to make measurements, using various values directly, and also as often as may be necessary, a possibly repeated at a later date, and without its being necessary, in order to go on to a new operation or series of operations, to cancel out what has gone before i.e. the co-relation reports drawn up with regard to the situation in hand and the economic facts considered.

The specific object of the present invention is a numerographic table intended particularly for the recording of results observed in various groups of a whole which is under consideration, comprising a series of parallel and graduated logarithmic scales each concerned with one of the groups of the said whole, a mark being put on the part of the scale corresponding numerically to the result observed for that particular group. The table has the feature that the said scales are positioned in relation to each other in such a way that a line perpendicular to the whole of the scales intersects each of them at a level corresponding to the specific value of each group, the whole being operated in such a way that it is possible to compare, when the said marks have been made on at least some of the scales, the proportion between the values recorded on the table and the specific values, the recorded values being in perfect co-relation when they are in alignment on one and the same straight line.

In a preferred embodiment of the invention the table has the feature of a screen which is light permeable and has, corresponding to the said logarithmic scales, at least two limits per scale disposed on both sides of a straight line of co-relation perpendicular to the whole of the scales these limits corresponding for each group to maximum and minimum variations relative to the specific values and their distance in relation to the said straight line corresponding on the said scales to a length equivalent to the ratio of the value of the standard to the value shown by the corresponding portion of this straight line, the whole being operated in such a way that, when by means of a transparency the mark of at least one result observed in at least one group and noted on the table is made to coincide with the said co-relation straight line, it is possible to determine the relative position of the results observed in the other groups in relation on the one hand to the standards attributed to each of them and on the other hand to the co-relation straight line.

A further object of the invention is a process for making a table as indicated above in which as many strip segments carrying a logarithmic scale are fixed on a support as there are groups, the said strips being disposed side by side on a straight line perpendicular to the whole of the scales and intersecting each of them at a level of the scale representing the specific value of the scale, the feature being that the said segments are cut from a strip disposed in the form of a rolled up band, on which the said scales are reproduced in sequence.

The invention will now be described by way of example with reference to the accompanying drawings.

FIGURE 3 shows the table.

FIGURES 4 and 4a are similar views of two further embodiments.

Figure 1:
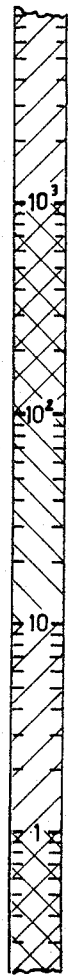
FIGURE 1 is a view of a portion of the strip used for the making of the table.

The table shown in FIGURE 3 of the drawings comprises four columns indicated by the letters A–E, each having a logarithmic scale of the same modulus. This table is intended to receive marks corresponding to the placing in the table of values observed, representative of the five items, which reflect the financial situation of a particular business and the comparison of these items on the one hand with one another, and on the other hand, as will appear in the description which follows, in relation to a reference system constituted by the whole of the results obtained in the branch of activity to which the business belongs, comprising a series of three quartic values, commonly called lower quartic, median ratio and upper quartic.

In the table considered the items A-E are as follows:

A—net sales
B—net profit realised
C—value of goods in stock
D—current liabilities
E—assets in circulation.

For the branch of activity in which the business is included, when it is desired to study the respective position of a given number of items in relation to each other these items are put two by two in the form of relationship usually called ratios. For these ratios there will obviously be recorded for the whole of the branch various values from which it is however possible to select the statistical values of the types which follow;

(a) median value
(b) upper quartic value
(c) lower quartic value

For the given branch of activity there were observed, for the items given, the ratio values indicated below.

| Ratios | Lower quartic | Median ratio | Upper quartic |
|---|---|---|---|
| Rotation of stocks C/A, percent | 10 | 12.3 | 19 |
| Rotation of Assets in Circulation E/A, percent | 12 | 18.2 | 28 |
| Net marginal profit of the working year B/A, percent | 3.5 | 3.9 | 5.2 |
| Liquidity D/E, percent | 64 | 62 | 86 |
| Current Liabilities covered by stock C/D, percent | 154.6 | 109 | 78.9 |

From the terms and values of the median ratio there may be calculated the absolute theoretical values for each of the items, this being done for example in the following way: the figure of the net sales is entered at $A=100$ and from this are deducted the proportional values of the various other items which are in the example considered as follows: $C=12.3$ $E=18.2$ $B=3.9$.

The value for D is obtained as follows.

$$D = \frac{E\,62}{100} = 11.28$$

The various logarithmic scales carried in the columns A–E in the table of FIGURE 3, are disposed on a common straight line which is perpendicular to them and for which there is proportion between all the values figuring on the scale at the level of this straight line.

The various logarithmic scales of the colums A–E are disposed side by side and placed at a level such that $A=100$ for $C=12.3$; $E=18.2$; $B=3.9$ and $D=11.28$. This level is indicated in the drawing by the axis V–W which is accordingly representative of the median position of the branch of the business considered. All the values of the items A–E which an in alignment on a straight line different from the axis V–W but parallel therewith would it should be understood also be in corelation because of the essential property of the logarithmic scale by which two numbers having a proportional relationship to each other and separated on such a scale by a distance which is constant whatever may be the value of these numbers if their ratio is constant. In this way, with the whole table of logarithmic scales being arranged in the manner described, and into the values observed shown in V scale is as to be compared with each other or with the medial values of the reference system chosen set out in the table, it will be possible to determine automatically if the values observed are in co-relation with the values drawn up or other values also indicated in the table or if on the contrary they are greater or less than the median values of the reference system; it suffices in actual fact to observe the position of the marks and the scales of the table at the level of the graduation of these scales corresponding to the absolute value observed that they represent.

By way of example from the table of FIGURE 3 have been put marks forming a broken line X–Y and corresponding to financial items the absolute value of which is as follows:

A net sales francs 1,100,000
B (net profit) francs 34,000
C stock francs 135,000
D current liabilities francs 150,000
E assets in circulation francs 200,000

In relation to a co-relation straight line X–Y' passing through the value 1,100,000 of column A, it can immediately be seen that the values of the items E and C are exactly in co-relation with the value of A and in co-relation with the reference position constructed in the table whereas the item D and the item B are not, the amount of the items D being above that of the item B below the co-relation straight line X–Y' which signifies in other words that the outstanding liabilities D francs 15,000 is proportionally too high in relation to the figures of the net sales A, the assets in circulation and the stocks C, and that the net profit realised B is too low in relation to these figures. This simple observation does not however make it possible as we shall see below to deduce automatically that the position of the business considered is good or bad.

With this table it is possible to compare the financial items of a business appearing in the accounts of any certain year with those of the accounts of one or of several other years or with the values of the budget or the project recorded in those tables. It should be understood that the necessary relative values for the construction of a table can also be value observed over a great number of years in the actual business itself or it can be valued at as an objective or as a standard.

The table of the invention can be used to compare, to measure or to estimate the results observed in all spheres of acivity which might possibly form the object of study or of statistical reports, economic or political fact or figures or work which could be put in the form of figures forming part of the same group of facts or of different groups.

The drawing up or the manufacture of a table is extremely easy and very quick if use is made of the process of the invention, and in actual fact it suffices to use one or several rolls of strip ribbon, a fragment of which is seen in FIGURE 1, this ribbon carrying for example a series of groups of four logarithmic scales of the same modulus disposed end to end, the scales passing from one to ten, from 10 to $10^2$, from $10^2$ to $10^3$, and from $10^3$ to $10^4$, this value again coinciding with 1.

Figure 2:
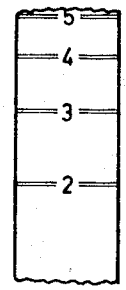
FIGURE 2 is a fragmentary view on a larger scale of the strip in FIGURE 1.

As show in more detailed manner in FIGURE 2, the graduations are carried on one side and the other of the central part of these strips, which is reserved for the recording of figures indicating their value.

The strip can be transparent, translucent or opaque. The different logarithmic bands are cut taking into account the data of the position concerned and are fixed on a transparent, translucent or opaque support by adhesive, disposed parallel to each other and perpendicular to a common reference axis representing specific values of the situation considered. The band will preferably be self-adhesive, but this is not essential.

In an alternative embodiment of the invention the strip can be constituted by a photo sensitive film, the image of which can be reproduced in enlargement or on small scale by any known means.

The whole is then reproduced by any suitable means in the same shape or in a different shape which can be either larger or smaller according to the need which arises. This reproduction will preferably be transferred to a support, a plate, a film, or a stencil, and so on, which makes possible the reproduction of the table with any required number of copies.

As described above, economists are not content in appreciating the progress of a business with comparing the financial results obtained by that business, obtained directly in relation to each other, but they will also want to study the aspect of these results observed in relation to other positions observed in the branch for the same items and admitted as pertinent. Such items are, for example the lower quartics and upper quartics observed for such values. This study is usually made quantitatively by comparing arithmetically value for value which can be presented in the form of fraction quotients or of values in percentage from which it is only possible to make comparisons after long calculations. Furthermore these comparisons are only made in series of two, and the results obtained are purely subjective because one is obliged to use a common denominator.

The table in accordance with an embodiment of the invention as shown in FIGURE 4 enables one to place immediately the values of the various items of the balance sheet of the business in relation to information observed in the whole of the branch of the same activity, without having to make special calculations.

It has already been pointed out that in the case of a logarithmic scale of the same modulus for the whole of its length the distance separating two graduations corresponding to two numbers, the quotient of which has a certain value, remains constant on this scale, whatever may be the value of these numbers, if their quotient remains constant; if therefore, one puts on the table of FIGURE 3 a transparent or translucent screen and one traces on this screen marks to the right of the graduations characteristic of one of the logarithmic scales of the value table corresponding to that of the lower quartic, of the median ratio or of the upper quartic, the distance between these marks will be representative of the difference in percentage existing between these values. This difference will be constant whatever may be the placing of the band chosen for indicating the marks mentioned above, as is described.

FIGURE 4 shows clearly an embodiment of a screen obtained in accordance with these considerations; this screen is divided, as was the table of FIGURE 3, into five columns A–E corresponding to the various items taken into consideration for the business the position of which it is desired to examine.

As previously, making $A=100$, the relative value for each item, corresponding to the lower quartics to the median ratio, and to the upper quartic observed, is as follows:

| Item | Lower position | Median position | Upper position |
| --- | --- | --- | --- |
| C | 10 | 12.3 | 19 |
| E | 12 | 18.2 | 28 |
| B | 3.5 | 3.9 | 5.2 |
| D | 6.5 | 11.3 | 24.1 |

In column E, the horizontal straight line 1 corresponds to the relative lower value of the 12 percent, the straight line 2 to the median value of 18.2%, and the straight line 3 to the upper value of 28%; the distance separating these various straight lines corresponds to the distance separating the lines of the position of values which they represent on the logarithmic band used.

As the relative values of the items B, C, and D are also taken in relation to the value of $A=100$, the straight lines will be aligned corresponding to the median values of these items, and those corresponding to the lower and upper values will be put on either side of the straight lines. In this way in column C the straight line 4 corresponds to the lower value 10.0 and the straight line 5 to the upper values 19.0; in the column D the straight line 6 constitutes the limit corresponding to the value 6.5 and the straight line 7 that corresponding to the value 24.1; finally in column B the straight line 8 represents the lower limit corresponding to a value 3.5 and the straight line 9 the upper limit corresponding to a value 5.2.

The surface between the straight lines representing the extreme values is cut out by reading windows 10.

To study the financial situation of the business of which the table of FIGURE 3 carries the financial results observed, it suffices to put the screen of FIGURE 4 on the table by making the straight lines 2 coincide, for example with the mark put in the column A at the level of the letter X to look through the windows 10 to see the position occupied by the mark recorded on the table in the corresponding columns and to consider their position in relation to the segments of the straight line 3 between these windows. The reference 10a and 10d indicate in FIGURE 3 the portions of logarithmic bands visible through windows and these portions are sketched in dot/dash lines.

Accordingly it is possible to confirm that the values of the items E and C remain included in the windows of the corresponding columns of the screen and that the values are accordingly admissible if one refers to the general situation of the branch considered.

It is also possible to confirm as far as concerns the value recorded in the column D that this value although greater than the theoretical co-relation value is acceptable because it is within the sphere of the window of the screen corresponding to this column which reflects for this item the average position of the business of the branch.

The value of item B which had already been considered as too low by simple examination of the table of FIGURE 3 is on the other hand situated on the outside of the reference standards and is accordingly not acceptable.

Figure 4A:
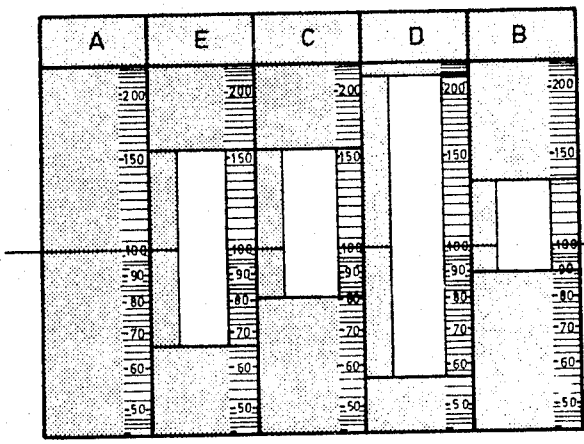

In an embodiment in FIGURE 4a the screen is provided with logarithmic scales of the same modulus as those used in the table each associated with one of the windows 10a to 10d and placed in such a way that the graduation line of value 100 is in alignment with the corresponding straight line at the median ratio of each window and going out with the common axes to all the items; as a variation the logarithmic scale could be aligned on another original value corresponding to a path of 10.

In this way it is possible to read on the graduation the relation in percentage between the marks appearing in the windows and the ideal median value.

It should be understood that the invention should not be restricted to what has been shown or described in the drawings; the shape of the window cut in the screens of FIGURE 4 and FIGURE 4a could be quite different from that shown. In another embodiment and in particular when the table is not made as shown of strips but simply by lines graduated logarithmically the screen could simply comprise columns corresponding to various items to be analyzed and on which would be indicated the marks in the form of lines for example corresponding to the median ratio and to the lower and upper quartic.

I claim:

1. Numerographic apparatus for the systematic determination of the relationship between a plurality of co-related variables comprising a fixed table having a plurality of fixed parallel graduated logarithmic scales of the same modulus, each one of said scales being assigned to one of said co-related variables, said scales being so positioned with respect to one another that a line perpendicular to the scales intersects each scale at a level corresponding to a specific value of the variable assigned to that scale which specific value is co-related to the intersected specific values of the other scales, a light permeable screen disposed over said table, said screen having a plurality of pairs of fixed limit marks, each pair of said limit marks corresponding to a maximum value and a minimum value on a different one of said scales relative to said specific value on said scale, and a plurality of reading windows on said screen, each of said reading windows being aligned with and extending between said maximum value and said minimum value of a different one of said scales.

2. An apparatus according to claim 1, wherein on said screen are disposed a plurality of parallel graduated logarithmic scales, said scales of said screen being parallel to the scales of the fixed table and one of each of said scales of said screen being disposed adjacent to a different one of said windows, and said screen having a plurality of graduation lines, each of said graduation lines being disposed adjacent a different one of said windows at a median point between the limit marks associated with the window.

References Cited by the Examiner

UNITED STATES PATENTS

| | | | |
|---|---|---|---|
| 753,457 | 3/1904 | Weissbrod | 281—44 X |
| 2,047,942 | 7/1936 | Culligan | 235—89 |
| 2,171,602 | 9/1939 | Schantz | 235—86 X |
| 2,527,776 | 10/1950 | Taaffe | 235—86 X |
| 2,635,806 | 4/1953 | Lermer | 235—61 |
| 2,815,172 | 12/1957 | Van Arsdale et al. | 235—70 |

RICHARD B. WILKINSON, *Primary Examiner.*

LEO SMILOW, *Examiner.*

C. G. COVELL, J. G. MURRAY, *Assistant Examiners.*